3,259,522
MANUFACTURE OF ACTIVE MASS FOR LEAD-ACID STORAGE BATTERY PLATES, ACTIVE MASSES SO PRODUCED, AND PLATES WITH SUCH MASSES
Ernst Voss and Alexander Koenig, both of Frankfurt am Main, Germany, assignors to Varta Aktiengesellschaft, a corporation of Germany
No Drawing. Filed Dec. 11, 1961, Ser. No. 158,598
Claims priority, application Germany, Dec. 24, 1960, A 36,371
6 Claims. (Cl. 136—27)

The present invention relates to a process of preparing an active mass for electrode plates of lead-acid storage batteries, to active masses produced by such a process, and to battery plates incorporating such active masses.

Pastes now commonly used in making the familiar pasted-plate batteries are prepared by mixing finely divided lead oxide or a blend of oxides which may contain metallic lead in powder form with a dilute solution of sulfuric acid. Experience has shown that the ampere-hour capacity of the battery increases, i.e. the efficiency of the active mass rises, with an increase in the amount of sulfuric acid used in the preparation of the paste because this increases the porosity and thus the apparent surface of the active mass. However, the more sulfuric acid is added the more difficult it becomes to mix the paste because of localized over-heating and, in addition, the formed active mass becomes so expanded and loose as to result in shedding of the active material, thereby shortening the useful life of the battery. Thus, despite all efforts to remedy this situation, either the capacity or the useful life of the battery had to be reduced in conventional paste manufacturing processes and the danger of short-circuits was ever present.

One of the difficulties encountered in the manufacture of pasted plates has been the tendency of the active mass to develop cracks during drying of the paste, which considerably accelerates washing out of the active mass from the grid during the battery operation, particularly when such batteries are subjected to frequent shocks or impacts, as may be the case, for instance, in automobile starter batteries. It has been proposed to overcome this difficulty by adding certain inert substances to the electrochemically active mass during or after its preparation but practical success has been lacking in these efforts, not to mention the fact that such inert additives reduce the amount of active mass per available space unit.

If only a small quantity of sulfuric acid is added, the correspondingly slight expansion results in hard, dense plates but this leads to a limitation in the ampere-hour capacity of the battery, due to the small apparent surface of the active mass, i.e., the small "inner" surface created by the porosity of the mass upon expansion. Thus, either the capacity or the useful life of the battery had to be sacrificed and it has been found impossible to produce an active mass of sufficient rigidity and sufficiently large apparent surface to produce a battery of high capacity and long life.

Similar difficulties have been encountered in the preparation of the active mass in battery plates with tubes. If the active mass in such plates is made from litharge, the electrochemical efficiency of the mass will be the greater, the finer the litharge powder with which the tubes are filled. However, this correspondingly increases the danger of washing out, and various special forms of perforated tubes have been designed in an effort to slow this process down but none has been capable of preventing wash-out of active mass. Furthermore, surrounding the active mass in the perforated plastic tubes with a layer or web, for instance, of glass fiber, or using woven tubes of synthetic fibers which reduce washing out, simultaneously decreases diffusion of the electrolyte into the active mass. This is very undesirable because it is important to equalize as quickly as possible differences in the concentration of the electrolyte, which are due to chemical reactions in the active mass during high current discharges as well as during charging of the battery.

It is accordingly a primary object of the present invention to provide an active mass of great rigidity as well as a large apparent surface for lead-acid storage battery plates to produce batteries of great capacity and long life.

The above and other objects and advantages are accomplished in accordance with this invention by preparing the active mass from a starting material consisting of lead oxide hydrate, lead oxide hydroxide, or lead hydroxide, and thermally treating the starting material with water vapor at a temperature above the point of thermal stability of the material.

The preferred starting compound is lead oxide hydroxide represented by the alternative formulas $$5PbO \cdot 2H_2O \text{ or } 3PbO \cdot 2Pb(OH)_2$$

and improved processes of preparing this compound are described and claimed in our copending applications Serial No. 158,597, now U.S. Patent Number 3,194,633, and No. 158,599, filed on even date herewith.

It would also be possible to use a compound having the formula $H_2O_2Pb$, described by Jacques Robin, Bull. Soc. Chim. France, vol. 5, 1956, page 680, which may be lead hydroxide, $Pb(OH)_2$, or lead oxide hydrate, $PbO \cdot H_2O$.

These lead compounds become unstable at a temperature of about 45° C. to 50° C. and when they are exposed to a thermal treatment, such as with water vapor, for a period of 20 minutes to three hours, depending on the thickness of the active mass, they are converted into lead oxide and primarily into orthorhombic crystals of plumbous oxide which crystals simultaneously intertwine to form a rigid, self-supporting, and crack-free lattice of an active mass.

This lattice has considerable mechanical strength and, after formation, its apparent surface, i.e., its total inner surface, is above about 5 sq. m./g. when used in positive plates, and above about 2 sq. m./g. when used in negative plates. It has these properties immediately after formation and retains them for a very considerable operating time of the battery, thus constituting an active mass with two characteristics which could heretofore not be combined. Experiments have shown that, compared to conventional active masses of similar mechanical stability, the efficiency of the intertwined crystalline active mass lattice of the present invention is increased by about 50%.

Furthermore, considerable production economies are obtained because the starting material need only be treated with water vapor for relatively short periods of time while the sulfation and drying of conventional active masses has taken from 16 hours to 40 hours in the case of pasted plates and from 4 hours to 18 hours for plates wherein the active mass is held in tubes before the active mass could be formed. In contrast to this, the plates of the present invention may be formed immediately after the short water vapor treatment which does not exceed 2 hours at the most.

Lead oxide hydroxide is a white substance which is stable in the presence of moisture up to about 45° C. to 50° C. When it is heated above this temperature, it is converted primarily into orthorhombic plumbous oxide PbO. A paste of this compound useful for applying to a battery plate grid is obtained if about 10%, by weight, of water is added to the dry lead oxide hydroxide powder or if drying of the lead oxide hydroxide is interrupted during its preparation at a point when it still contains that much water.

As the following examples illustrate, the water vapor treatment of the electrodes provided with such an active mass is exceedingly simple:

Example 1

A paste consisting of lead oxide hydroxide $5PbO.2H_2O$ containing about 8%, by weight, of water is applied to a lead-acid battery plate grid. The pasted grid is kept standing in the air for about an hour. Standing times of as little as 30 minutes or as much as 100 minutes have also been found satisfactory. The pasted plate is then exposed to water vapor of a temperature of about 130° C. The water vapor temperature may usefully be about 120° C. to 140° C. After about one hour and a half, the paste has been converted, in the main, into a rigid lattice comprising primarily intertwined orthorhombic crystals of plumbous oxide.

Example 2

The tubes of a lead-acid battery plate are filled with dry lead oxide hydroxide powder $5PbO.2H_2O$ and exposed to water vapor of about 95° C. to about 100° C. for two hours. After this treatment, the active mass in the tubes consists primarily of orthorhombic plumbous oxide PbO.

Example 3

An active mass for negative plates is composed as follows:

| | G. |
|---|---|
| Lead oxide hydrate $PbO.2H_2O$ | 998 |
| Lamp black | 1.5 |
| Barium sulfate | 0.5 |

Plates pasted with such an active mass are exposed to water vapor at a temperature of about 100° C. for two hours. Thereby, the lead oxide hydrate is converted into intertwined orthorhombic crystals of plumbous oxide.

Example 4

An active mass for negative plates is composed as follows:

| | G. |
|---|---|
| Lead oxide hydroxide $2PbO.2H_2O$ | 995 |
| Lamp black | 4 |
| Barium sulfate | 1 |

The treatment with water vapor is carried out in the same manner as described in Example 3 yielding also an intertwined mass of orthorhombic crystals of plumbous oxide.

Example 5

An active mass for negative plates or tubes is composed as follows:

| | G. |
|---|---|
| Lead oxide hydroxide $5PbO.2H_2O$ | 990 |
| Lamp black | 4 |
| Sodium humate | 3 |
| Barium sulfate | 3 |

The treatment with water vapor is carried out in the same manner as described in Example 3 whereby intertwined orthorhombic crystals of plumbous oxide are obtained.

Of course, in place of lead oxide hydroxide of the formula $5PbO.2H_2O$ and lead oxide hydrate $PbO.2H_2O$ as used in the preceding examples, there may also be used lead hydroxide of the formula $Pb(OH)_2$, lead oxide hydrate of the formula $PbO.H_2O$, lead oxide hydroxide of the formula $2PbO.H_2O$, or the like compounds for producing the lattice of orthorhombic plumbous oxide. The procedure is the same as described in said examples.

After the plates prepared according to Example 1 or 2 have been cooled, they are formed in the conventional manner, the oxidation of the plumbous oxide (PbO) to very hard and rigid plumbic oxide ($PbO_2$) being effected very readily. In a similar manner negative plates or tubes are formed whereby, however, after formation no plumbic oxide ($PbO_2$) is present in the plate but spongy metallic lead. Typical formation processes are described, for instance, in Vinal's "Storage Batteries," Fourth Edition, John Wiley & Sons, Inc., on pages 37 et seq., and the present invention is not concerned with any specific formation process.

As noted hereinabove, while hard, dense battery plates have been produced heretofore, their capacity, however, was so low and the efficiency of their active masses so small that their practical use was out of the question. Heretofore, acceptable, more highly expanded positive plates of sufficient rigidity have had apparent surfaces of about 2 sq. m./g. to less than 5 sq. m./g. of active mass while the apparent surface of an active mass prepared according to this invention exceeds 5 sq. m./g. without impairment of the rigidity of the mass, increases of 50% to 400% of the apparent surface of the active mass over conventional pasted plates or plates with tubular active masses having been obtained. These improvements have been found in positive as well as in negative plates and in pasted plates as well as in plates with tubular active masses. In general, however, in negative plates the apparent surface is of the magnitude of 2 sq. m./g. However, all the other advantages achieved by the present invention, are also apparent in negative plates.

In view of the fact that the formed active masses prepared according to the invention are rigid and self-supporting, they can even be used without supports. Thus, in plates with tubular active masses, such as slotted hard rubber tubes, tubes of perforated plastic material with glass fiber web lining, or tubes woven of synthetic fibers, it is possible to dispense with the perforated, slotted, or otherwise electrolyte-permeable tubes. Rather the paste or the dry starting material can be applied to the grid, the applied starting material can be shaped and molded on the grid in the form of a plurality of rods extending along the grid, whereafter the simple mold is removed, and the shaped material is thermally treated with water vapor as described in Examples 1 to 5. This will produce a plate which is distinguished from the conventional plates with tubular active masses only by the lack of tubes for holding the masses. The individual rods of active mass are self-supporting.

Since, with the same available volume, the diameters of the active mass rods of the plates may be increased by the thickness of the otherwise required tubular active mass containers, it is obviously possible to use more active mass in the same space. The active mass having a higher efficiency per g. these two factors make it possible thus to produce mechanically very stable plates the efficiency of which is increased by more than 50%. In addition, considerable economies are obtained by omitting the tubes and such plates have the further advantage of rapidly equalizing the concentration of the electrolyte during high loads and fast charging of the battery, which produces very favorable results.

Battery plates with active masses prepared according to this invention have shown to maintain their high initial capacity even after 1000 to 1500 operating cycles and more. The storage capacity or electrical energy of conventional active masses is a third lower than that of the active masses of the present invention so that the same battery capacity may be obtained with much less active mass. If, on the other hand, the same amount of active mass is used, the battery capacity (ampere-hours) is considerably increased without an increase in space requirements.

While the invention has been described in connection with certain embodiments thereof, it will be clearly understood that many modifications and variations may occur to the skilled in the art without departing from the spirit and scope thereof, as defined in the appended claims.

We claim:

1. A process of preparing a rigid crystal lattice for lead-acid storage battery plates, comprising the step of converting by subjecting to water vapor at a temperature of at least about 50° C. for about 20 minutes to about three hours lead oxide hydrate of the formula $5PbO.2H_2O$ into a rigid lattice of intertwined orthorhombic crystals of plumbous oxide.

2. A process of preparing a rigid crystal lattice for lead-acid storage battery plates, comprising the steps of supporting a mass of a lead oxide hydrate of the formula $5PbO.2H_2O$ on a plate and converting the lead oxide hydrate by subjecting it to a thermal treatment with water vapor at a temperature of at least about 50° C. for about 20 minutes to three hours into a rigid lattice of intertwined orthorhombic crystals of plumbous oxide.

3. A process of preparing a rigid crystal lattice for lead-acid storage battery plates, comprising the steps of filling a plurality of plate tubes with a dry lead oxide hydrate of the formula $5PbO.2H_2O$, converting the powder in the tubes by subjecting it to a thermal treatment with water vapor at a temperature of at least about 50° C. for about 20 minutes to three hours into a rigid lattice of intertwined orthorhombic crystals of plumbous oxide, and immediately thereafter subjecting the rigid lattice of plumbous oxide to formation.

4. A process of preparing a rigid crystal lattice for lead-acid storage battery plates, comprising the steps of applying an aqueous paste of a lead oxide hydrate of the formula $5PbO.2H_2O$ to a plate grid, shaping the paste into individual rods extending along the grid, converting the paste by subjecting it to a thermal treatment with water vapor at a temperature of at least about 50° C. for about 20 minutes to three hours into a rigid lattice of intertwined orthorhombic crystals of plumbous oxide, and immediately thereafter subjecting the rigid lattice of plumbous oxide to formation.

5. A process of preparing a rigid crystal lattice for lead-acid storage battery plates, comprising the steps of supporting a mass of lead oxide hydrate of the formula $5PbO.2H_2O$ on a carrier for the active mass and converting the lead oxide hydrate into a rigid crystal lattice of intertwined orthorhombic crystals of plumbous oxide by subjecting said lead oxide hydrate to a thermal treatment with water vapor at a temperature of at least about 50° C. for about 20 minutes to about three hours until conversion of said lead compound into a rigid lattice of intertwined orthorhombic crystals of plumbous oxide is completed.

6. A process of preparing a rigid crystal lattice for lead-acid storage battery plates, comprising the steps of supporting a mass of a lead oxide hydrate of the formula $5PbO.2H_2O$ on a carrier for the active mass and subjecting the lead oxide hydrate to a thermal treatment with water vapor at a temperature of at least about 50° C. for about 20 minutes to about three hours until conversion of said lead oxide hydrate into a rigid lattice of intertwined orthorhombic crystals of plumbous oxide is completed.

References Cited by the Examiner

UNITED STATES PATENTS

| | | | |
|---|---|---|---|
| 988,963 | 4/1911 | Barton | 23—146 |
| 1,526,817 | 2/1925 | Wright | 136—9 |
| 2,211,775 | 8/1940 | Haunz | 23—146 |
| 2,217,235 | 10/1940 | Rieser | 23—146 |
| 2,315,188 | 3/1943 | Clapson | 23—127 |
| 2,686,213 | 8/1954 | Smyth | 136—34 |
| 2,759,037 | 8/1956 | Greenburg et al. | 136—26 |
| 2,888,370 | 5/1959 | Damon et al. | 23—146 |
| 3,067,273 | 12/1962 | Duddy | 136—27 |
| 3,124,486 | 3/1964 | Malloy | 136—27 |

FOREIGN PATENTS

| | | |
|---|---|---|
| 525,993 | 6/1956 | Canada. |
| 257,019 | 8/1926 | Great Britain. |
| 784,598 | 10/1957 | Great Britain. |

OTHER REFERENCES

Handbook of Chemistry and Physics, 43rd edition, pages 592–593.

Jones, Inorganic Chemistry, 1947, page 647.

Mellor, Comprehensive Treatise on Inorganic and Theoretical Chemistry, volume 7, 1927, pages 662–663.

Wells, Structural Inorganic Chemistry, 1945, page 156.

Wells, Structural Inorganic Chemistry, 2nd edition, 1950, page 367.

WINSTON A. DOUGLAS, *Primary Examiner.*

JOSEPH REBOLD, JOHN R. SPECK, MURRAY TILLMAN, JOHN H. MACK, *Examiners.*

B. J. OHLENDORF, *Assistant Examiner.*